UNITED STATES PATENT OFFICE.

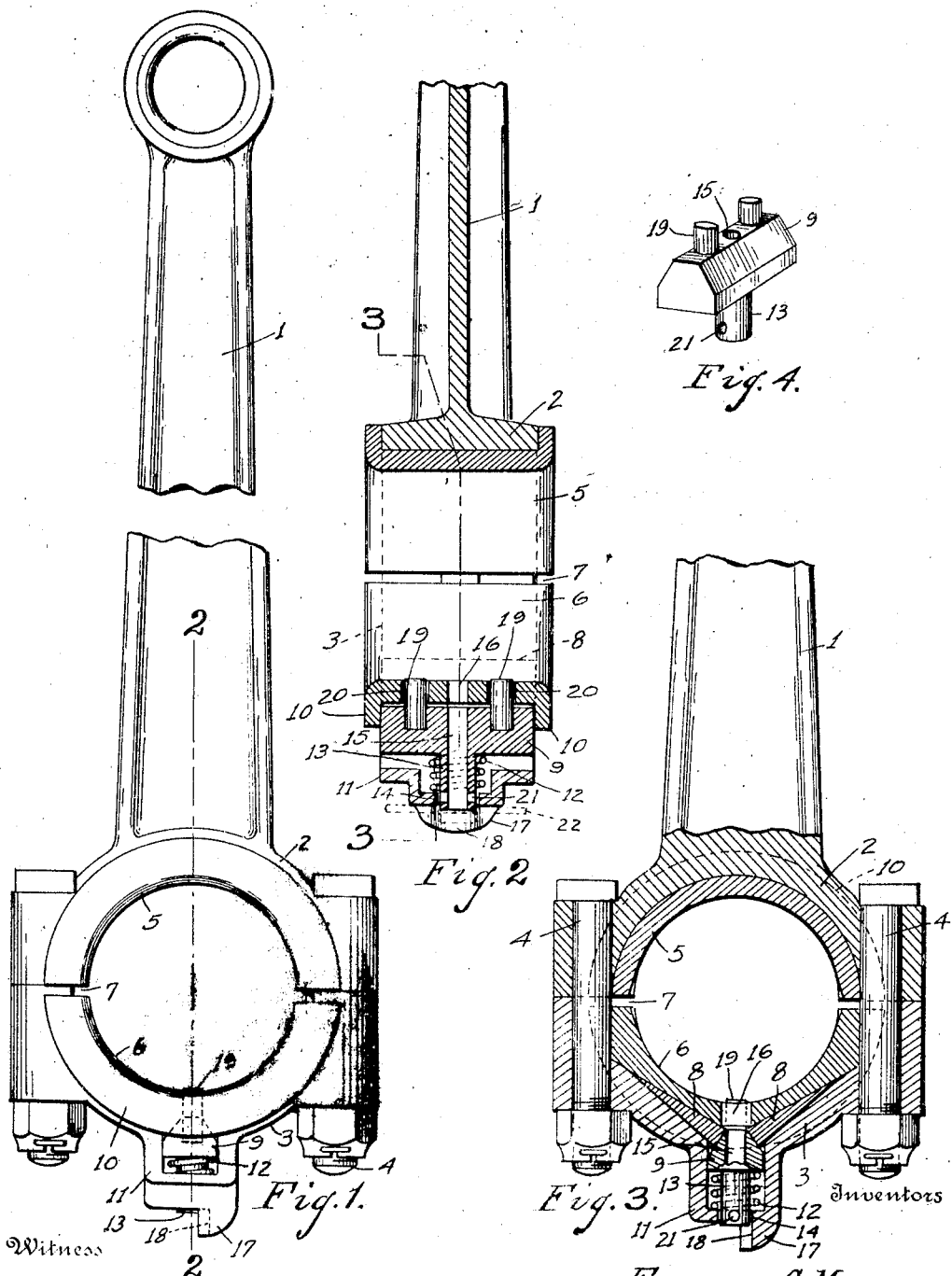

FRED G. MEYER AND BENJAMIN F. WHEELER, OF DETROIT, MICHIGAN.

JOURNAL-BEARING.

1,323,605. Specification of Letters Patent. Patented Dec. 2, 1919.

Application filed December 23, 1918. Serial No. 267,930.

*To all whom it may concern:*

Be it known that we, FRED G. MEYER and BENJAMIN F. WHEELER, citizens of the United States, residing at Detroit, in the county of Wayne and State of Michigan, have invented a new and useful Journal-Bearing, of which the following is a specification.

This invention relates to journal bearings and more particularly to the two-part bearings of connecting rods for engaging the crank-shafts of internal combustion engines.

The stresses which act at the point of engagement of a connecting rod and crank-shaft are of such nature as to subject the connecting rod bearing to considerable wear, this being especially true in the case of explosive engines wherein the connecting rod bearing is subjected to a rapid succession of violent impulses. To provide for taking up the wear in such bearings it is common practice to initially interpose between the two parts of the bearing a number of thin metal washers or shims which act as spacers to maintain a proper working relation between the bearing parts. With this method compensation for wear is made from time to time by removing a sufficient number of the shims to take up the lost motion. Each time that such an adjustment is made the engine is put out of use and a considerable expense for skilled labor is involved. Furthermore, the shim method of adjustment does not as rule permit a high degree of accuracy in adjustment, since often a reduction in the clearance between the bearing surfaces equal to the thickness of a single shim will cause binding through loss of concentric uniformity in the worn surfaces, while failure to make such reduction fully will allow the crank-shaft a slight play, resulting in the early necessity of another adjustment.

It is the object of the present invention to eliminate the afore-mentioned defects by providing a self-adjusting bearing having a special application to connecting rods, the construction being such that compensation for wear will be made continuously and automatically as the wear takes place during operation, thus reducing to a minimum the accumulation of lost motion resulting from wear and insuring a more perfectly concentric working relation between the wearing surfaces of the bearing.

A preferred embodiment of the invention is disclosed in the accompanying drawings, wherein;

Figure 1 is a view in front elevation of a connecting rod equipped with the herein-described adjusting means.

Fig. 2 is a longitudinal sectional view taken on line 2—2 of Fig. 1.

Fig. 3 is a view primarily in longitudinal section taken on line 3—3 of Fig. 2.

Fig. 4 is a detail perspective view of a self-adjusting key wedge employed in the novel construction.

In these views, the reference character 1 designates a connecting rod having at one end a bearing comprising complementary parts 2 and 3, the former being integral with the connecting rod and the latter clamped to the former by bolts 4. The bearing is lined with babbitt or other anti-friction metal bushings as indicated at 5 and 6. The bushing 5 of the member 2 is seated therein in the usual manner and may be of the ordinary construction. The bushing 6 of the bearing part 3 is of a novel construction and is adjustably mounted to move toward the bushing 5 to compensate for wear. Clearance as indicated at 7 is initially provided between the members 5 and 6 to permit of a predetermined maximum adjustment. The adjusting means comprises a pair of reversely opposed wedge members 8 interposed between the bushing 6 and bearing part 3, said wedges being symmetrically disposed with relation to the center line of the connecting rod and being respectively oppositely inclined to said center line at an angle of about sixty degrees; the butt ends of the wedges being spaced in opposed angular relation. The engaging faces of the members 3 and 6 are shaped to present corresponding plane surfaces to engage those of said wedges, as is clearly shown in Fig. 3. Between the butt ends of said wedges there is interposed a vertically disposed key wedge 9 having oppositely inclined faces which respectively provide end abutments for the wedges 8. The length of the key wedge 9 is substantially equal to the width of the bearing parts 2 and 3, as shown in Fig. 2, and it is so embraced between the flanges 10 of the bushing 6 as to prevent lateral play. The key wedge 9 is adjustably mounted to move radially of the bearing within a housing 11 formed as an integral extension of the member 3 and is urged toward the axis of the bearing by a coiled spring 12 compressed between said wedge and the lower wall of said housing. A tubular stem 13 projects integrally and centrally from the base of said wedge, its free end extending through an opening 14 in the lower wall of the housing 11, and the spring 12 embracing said stem is maintained in proper position. The bore of the tubular stem is continued through the body of the wedge 9, as indicated at 15, and registers with an orifice 16 in the bushing 6, thus being adapted to admit lubricating oil to the wearing surfaces of the bearing and its journal. To induce a flow of oil through the hollow stem 13 as the connecting rod sweeps through the supply of oil in the crank-case, (not shown) a lug 17 is formed upon the housing 11 with a concaved face 18 adjoining the opening of the stem. Said lug dipping in the lubricant in the crank-case will function in a manner well known in the art.

The key wedge 9 is provided with a bearing extension for engagement with the journal in the form of a pair of pins 19 preferably of "hard fiber" but which may be formed of the same anti-friction metal that composes the bushing of the bearing, said pins being set into the apex of the wedge one at each side of the passage 15 and projecting in a radial relation to the bearing through orifices 20 formed in the wall of the bushing 6. Said pins are so proportioned in length that they will be pressed by the spring 12 against the journal or crank shaft (not shown) when the same is embraced by the bearing and will thus primarily relieve the wedges 8 from the constant pressure of said spring through the restraining influence offered by said pins to movement of the key wedge. Any tendency toward looseness of the bearing resulting from wear of the journal, bushings and pins either separately or collectively permits of a corresponding advance of the wedge 9 and pins 19 toward the axis of the bearing, and since the key wedge 9 is in constant engagement with the wedges 8 there must result from the movement just described a spreading apart of the wedges 8 and a consequent adjustment of the bushing 6 toward the bushing 5. Thus the tendency toward looseness of the bearing which initiates movement of the system of wedges results in an immediate adjustment of the bearing bushings whereby said tendency is overcome. The lower end of the stem 13 is transversely apertured as indicated at 21 so that, during assembly, a pin 22 may be inserted in said aperture, as indicated in dash lines in Fig. 2, to temporarily hold the key wedge retracted against the tension of the spring and permit of sufficient initial separation of the bearing bushings to enable the free engagement of the shaft or journal therebetween, when the pin 22 may be withdrawn from the key wedge to set in action the system of wedges and establish the proper adjustment of the bearing parts.

From the foregoing description it will be seen that the invention provides a means whereby wear of a bearing is compensated for continuously as such wear occurs, so that the recurrent looseness and consequent manual adjustments which are to be contended with in the present practice are entirely avoided. It is evident that the useful life of the linings of bearings equipped with the described invention will be considerably longer than is the case where a periodic looseness is permitted, since it is well known that a loose bearing wears with greater rapidity than one which properly fits the journal. It may be noted that without the pins 19 compensation for wear would still automatically take place, but there would exist an undesirable pressure of the bushing 6 against the journal, which would offer such resistance to the passage of oil between the bearing surfaces as to prevent proper lubrication. The pins, however, relieve the wedges 8 and the bearing lining 6 from the force exerted by the spring 12 except when compensation for wear is occurring. An additional advantage of a continuous adjustment such as the invention provides, as compared to periodic adjustments such as are made in the present practice, lies in the fact that "high points" must occur in a bearing which is adjusted after having acquired a degree of lost motion, while the continuous adjustment prevents any appreciable deterioration of the bearing surfaces from their true cylindrical form and thus avoid formation of "high points". It is to be noted that back pressure exerted against the member 6 by the crank-shaft or journal is transmitted to the wedges 8 in a direction such that the component of said pressure acting toward the butts of said wedges will be either zero or very slight, and since such a component would be still further materially reduced as regards its effect in overcoming the spring 12, it is evident that no yielding of the member 6 will result from such pressure of the journal thereupon.

In the following claims the term "bearing member" is to be understood as designating either an adjustable lining such as shown at 6, or a lining and its backing adjustable as a unit.

What we claim is:

1. A self adjusting bearing comprising a pair of complementary bearing members, one of which is adjustable toward the other, a regulating member adjustable toward the bearing axis independently of said adjustable bearing and frictionally engageable with the journal mounted in said bearing, and means acting jointly to urge the adjustable bearing toward its fellow and to maintain engagement of said regulating member with the journal, the force exerted by said means being applied to the adjustable bearing only to the extent that the regulating member is advanced toward the journal.

2. A self adjusting bearing comprising a pair of complementary bearing members, one of which is adjustable toward the other, a mounting for the adjustable member, a pair of adjusting wedges interposed between the adjustable bearing member and its mounting at each side of the center line of the bearing and at an opposite inclination thereto, a key wedge engaging the butt extremities of said adjusting wedges, and means exerting a force urging said key-wedge toward the axis of the bearing.

3. A self adjusting bearing comprising a pair of complementary bearing members, one of which is adjustable toward the other, a mounting for the adjustable member, a pair of adjusting wedges interposed between the adjustable bearing member and its mounting at each side of the center line of the bearing and at an opposite inclination thereto, a key wedge engaging the butt extremities of said adjusting wedges, means exerting a force urging said key-wedge toward the axis of the bearing, and a member carried by said key-wedge engageable with a journal received by said bearing for regulating the force transmitted to the adjustable bearing through the wedges.

4. A self adjusting bearing comprising a pair of complementary bearing members, one of which is adjustable toward the other, a mounting for the adjustable member, a pair of adjusting wedges interposed between the adjustable bearing member and its mounting at each side of the center line of the bearing and at an opposite inclination thereto, a key-wedge engaging the butt extremities of said adjusting wedges, means exerting a force urging said key-wedge toward the axis of the bearing, and a lubricant passage jointly formed in said key-wedge and adjustable bearing.

5. A self adjusting bearing comprising a pair of complementary bearing members, one of which is adjustable toward the other, a mounting for the adjustable member having a substantially central and radial extension, a pair of adjusting wedges interposed between the adjustable bearing member and its mounting at each side of the center line of the bearing and at an opposite inclination thereto, a key-wedge housed within said extension of the adjustable bearing engaging the butt extremities of said adjusting wedges, and a spring within said extension urging said key wedge toward the axis of the bearing and acting to spread the adjusting wedges and thereby to shift the adjustable bearing member toward its fellow.

6. A self adjusting bearing comprising a pair of complementary bearing members one of which is adjustable toward the other, a mounting for the adjustable member, flanges formed upon the adjustable member at each end thereof embracing said mounting therebetween, a member movable toward the axis of the bearing and restrained from lateral displacement through engagement between said flanges, said member being carried by said mounting and a spring compressed between said member and the mounting urging said member toward the bearing axis.

7. A self adjusting bearing comprising a pair of complementary bearing members, one of which is adjustable toward the other, a mounting for the adjustable bearing having a substantially central and radial extension, a pair of adjusting wedges interposed between the adjustable bearing and its mounting at each side of the center line of the bearing and at an opposite inclination thereto, a key-wedge housed within said extension of the adjustable bearing engaging the butt extremities of said adjusting wedges, a spring within said extension urging the key wedge toward the axis of the bearing and acting to spread the adjusting wedges to thereby shift the adjustable bearing toward its fellow, a tubular stem projecting outwardly from said key-wedge and extending into an opening in said extension, and a lug upon said opening for deflecting lubricant into said stem and through a passage registering with the opening of said stem, jointly formed in the key-wedge and adjustable bearing.

In testimony whereof we sign this specification.

FRED G. MEYER.
BENJAMIN F. WHEELER.